(12) United States Patent
Maltsev et al.

(10) Patent No.: US 9,160,430 B2
(45) Date of Patent: Oct. 13, 2015

(54) MILLIMETER-WAVE TRANSCEIVER WITH COARSE AND FINE BEAMFORMING WITH INTERFERENCE SUPPRESSION AND METHOD

(75) Inventors: Alexander Maltsev, Novgorod (RU); Andrey Pudeyev, Novgorod (RU); Ali S. Sadri, San Diego, CA (US); Carlos Cordeiro, Portland, OR (US)

(73) Assignee: Intel Corporation, Santa Clara, CA (US)

(*) Notice: Subject to any disclaimer, the term of this patent is extended or adjusted under 35 U.S.C. 154(b) by 6 days.

(21) Appl. No.: 13/993,900

(22) PCT Filed: Apr. 13, 2012

(86) PCT No.: PCT/US2012/033602
§ 371 (c)(1),
(2), (4) Date: Jun. 13, 2013

(87) PCT Pub. No.: WO2013/154584
PCT Pub. Date: Oct. 17, 2013

(65) Prior Publication Data
US 2013/0308717 A1    Nov. 21, 2013

(51) Int. Cl.
*H04B 7/04* (2006.01)
*H01Q 3/36* (2006.01)
*H01Q 25/00* (2006.01)
*H04B 7/08* (2006.01)

(52) U.S. Cl.
CPC ............... *H04B 7/0417* (2013.01); *H01Q 3/36* (2013.01); *H01Q 25/00* (2013.01); *H04B 7/0885* (2013.01)

(58) Field of Classification Search
CPC .... H04B 7/0417; H04B 7/0885; H01Q 25/00; H01Q 3/36
USPC ........................................................ 375/267
See application file for complete search history.

(56) References Cited

U.S. PATENT DOCUMENTS

| 8,446,975 B2* | 5/2013 | Guess et al. ................. 375/267 |
| 2009/0185650 A1 | 7/2009 | Ravid et al. |

(Continued)

OTHER PUBLICATIONS

"International Application Serial No. PCT/US2012/033602, International Search Report mailed Dec. 21, 2012", 4 pgs.

(Continued)

*Primary Examiner* — Shuwang Liu
*Assistant Examiner* — Helene Tayong
(74) *Attorney, Agent, or Firm* — Schwegman Lundberg & Woessner, P.A.

(57) ABSTRACT

Embodiments of millimeter-wave transceivers with coarse and fine beam steering with interference suppression are generally described herein. In some embodiments, a millimeter-wave transceiver configured for multipath reception of multicarrier signals and includes RF circuitry to receive multicarrier signals through at least two independently controllable sub-arrays from first and second directions, a channel-estimation block to generate a set of weighting coefficients for each sub-array based on channel characteristics determined from each sub-array, the weighting coefficients generated for inter-channel interference (ICI) suppression, and maximum-ratio combining (MRC) circuitry to apply a set of the weighting coefficients to baseband signals from each sub-array and to combine the weighted baseband signals from each sub-array to generate combined baseband signals that represent a single data stream.

16 Claims, 4 Drawing Sheets

(56) References Cited

U.S. PATENT DOCUMENTS

| | | |
|---|---|---|
| 2009/0238156 A1 | 9/2009 | Yong et al. |
| 2010/0135238 A1 | 6/2010 | Sadri et al. |
| 2010/0208633 A1 | 8/2010 | Takano |
| 2010/0284359 A1* | 11/2010 | Kim et al. .................... 370/329 |
| 2011/0080898 A1 | 4/2011 | Cordeiro et al. |
| 2011/0243040 A1 | 10/2011 | Khan et al. |
| 2012/0040629 A1 | 2/2012 | Li et al. |
| 2013/0202054 A1* | 8/2013 | Khan et al. .................... 375/259 |

OTHER PUBLICATIONS

"International Application Serial No. PCT/US2012/033602, Written Opinion mailed Dec. 21, 2012", 4 pgs.

* cited by examiner

MILLIMETER-WAVE TRANSCEIVER WITH COARSE AND FINE BEAMFORMING WITH INTERFERENCE SUPPRESSION AND METHOD

This application is a U.S. National Stage Filing under 35 U.S.C. 371 from International Application No. PCT/US2012/033602, filed on Apr. 13, 2012, which is incorporated herein by reference in its entirety.

TECHNICAL FIELD

Embodiments pertain to millimeter-wave (mmW) communications. Some embodiments relate to millimeter-wave transceivers, including millimeter-wave transceivers configured to operate in accordance with the wireless gigabit alliance (WiGig) specification and the IEEE 802.11 ad specification for very-high throughput in 60 GHz. Some embodiments relate to transceivers configured to operate in accordance with IEEE 802.15.3 specification for high-rate WPANs.

BACKGROUND

The millimeter-wave band has the available spectrum and is capable of providing significantly higher-level throughputs than the microwave frequency band. Due to significantly higher attenuation levels and the directional nature of millimeter-wave signals, millimeter-wave devices (i.e., stations) generally employ highly-directional antennas as well as beamforming techniques for communicating. Some key usages of the millimeter-wave frequency band may include transmissions to a wireless display, wireless docking, sync & go, real-time video streaming, and high-definition television (HDTV) streaming, among others.

Once issue with millimeter-wave communications in interference, particularly inter-channel interference (ICI). Conventional beam-steering and beamforming techniques are unable to fully compensate for ICI since an antenna pattern generates may side lobes making it difficult to set a deep null in a desired direction.

Thus there are general needs for millimeter-wave transceivers and methods that are capable of suppressing interference including ICI.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
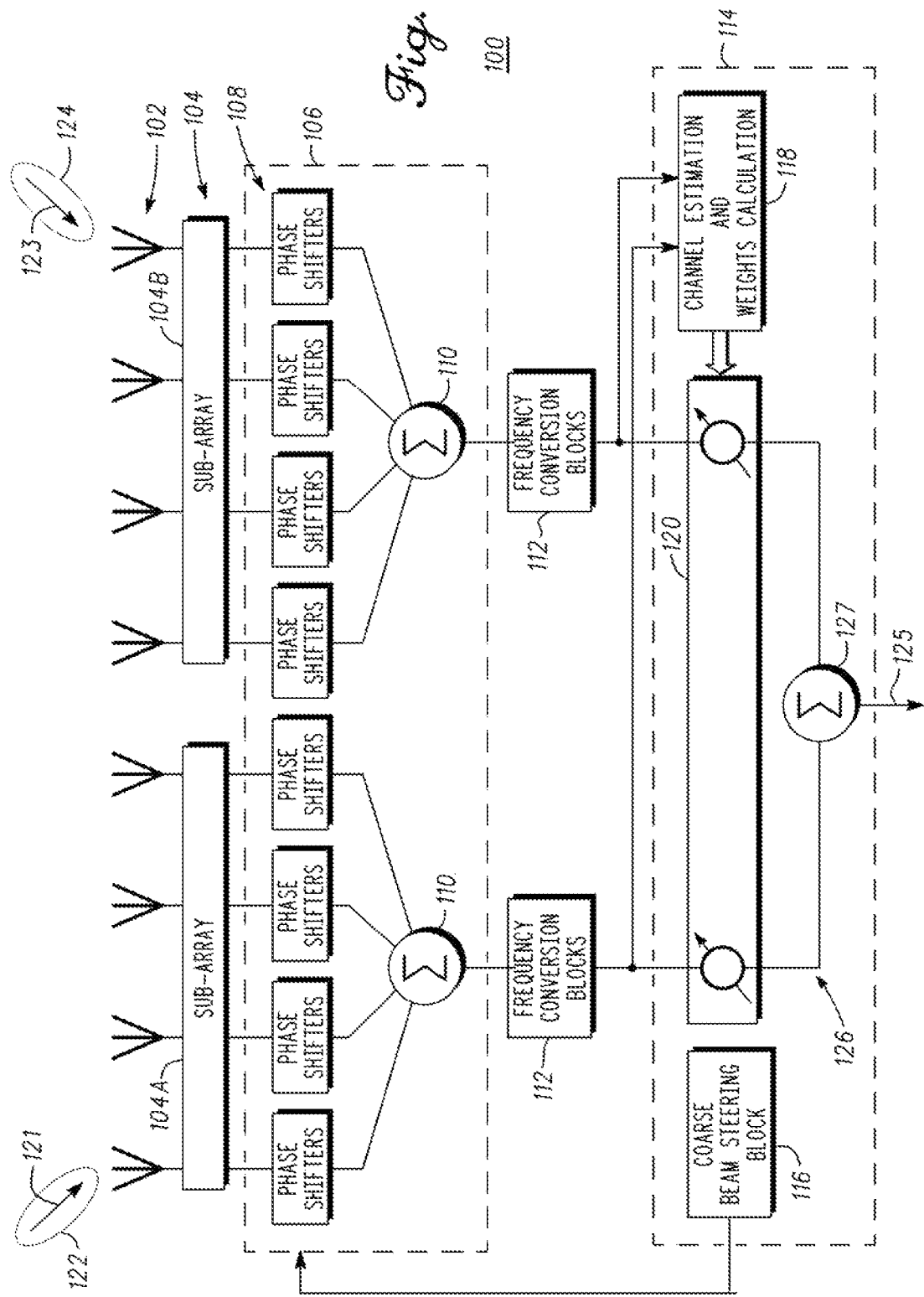
FIG. 1 illustrates a millimeter-wave transceiver with maximum-ratio combining (MRC) in accordance with some embodiments.

FIG. 1 illustrates a millimeter-wave transceiver with maximum-ratio combining (MRC) in accordance with some embodiments. Millimeter-wave transceiver 100 may be configured for multipath reception of multicarrier signals and may include RF circuitry 106 to receive multicarrier signals through at least two independently controllable sub-arrays 104. The independently controllable sub-arrays 104 may be configured to receive multicarrier signals from first and second directions. The millimeter-wave transceiver 100 may also include a channel-estimation block 118 to generate a set of weighting coefficients for each sub-array based on channel characteristics determined from each sub-array 104. The weighting coefficients may be generated for intercarrier interference (ICI) suppression. The millimeter-wave transceiver 100 may also include maximum-ratio combining (MRC) circuitry 126 to apply a set of the weighting coefficients to baseband signals from each sub-array 104 and to combine the weighted baseband signals from each sub-array 104 to generate combined output baseband signals 125 that represent a single data stream.

In these embodiments, the first and second directions may be different directions providing for multipath reception of multicarrier signals. A separate set of weighting coefficients may be generated for application to the baseband signals of each sub-array for maximizing throughput. As illustrated in FIG. 1, the first direction may be indicated by first ray 121 and the second direction may be indicated by second ray 123. Subsequent processing operations may be performed on output baseband signals 125, including demodulating and decoding, to generate data. In some embodiments, the first direction is associated with received signals of a highest signal level and the second direction is associated with received signals of a next highest signal level.

The millimeter-wave transceiver 100 may also include a coarse beam-steering block 116 to control an antenna array 102 comprising at least the two independently controllable sub-arrays 104. The coarse beam-steering block 116 may configure a first sub-array 104A to direct a first antenna beam 122 for receipt of multicarrier signals in the first direction and may configure a second sub-array 104B to direct a second antenna 124 beam for receipt of multicarrier signals in the second direction. Both the first antenna beam 122 and the second antenna beam 124 may together establish a multi-path channel with a transmitting station.

In these embodiments, coarse beamforming may be performed on received millimeter-wave signals by the coarse beam-steering block 116. Fine beamforming may be performed at baseband by weighting the baseband signals of each sub-array with sets of weighting coefficients. These embodiments are described in more detail below.

In some of these embodiments, one data stream may be received thorough two separate antenna beams (i.e., first and second antenna beams 122 and 124) providing for multipath reception. In these embodiments, both antenna beams may be highly-directional antenna beams and configurable to be directed in different directions. In some of these embodiments, each sub-array 104 may utilize approximately the same number of antenna elements, although this is not a requirement. A sufficient number of antenna elements (e.g., at least four) may be used to achieve high directivity. In some embodiments, antenna array 102 may include between 16 and 36 or more antenna elements. In the embodiments illustrated in FIG. 1 which utilize two independently controllable sub-arrays 104A and 104B, each sub-array may comprise half the total number of antenna elements. Although the antenna array 102 is illustrated in FIG. 1 as a linear or end-fire array, this is not a requirement as the antenna elements for each sub-array 104A and 104B may be arranged other configurations (e.g., rectangular). In some embodiments, each antenna element may be a separate aperture of a multi-aperture antenna.

In some embodiments, the coarse beam-steering block 116 may be configured to perform a beam selection procedure that includes performing sector scans to identify the first and second directions associated with the first and second rays 121, 123 based on signal levels of received signals from a transmitting station. The coarse beam-steering block 116 may direct the first antenna beam 122 in the first direction using the first of the independent sub-arrays 104A and may direct the second antenna beam 124 in the second direction using a second of the independent sub-arrays 104B. In some embodiments, coarse beam steering may be configured to maximize the total received power in each sub-array.

In some embodiments, the millimeter-wave transceiver 100 may be suitable for non-line-of-sight (NLOS) reception of signals in which there is no direct signal path or ray from the transmitting station. In these embodiments, the first and second sub-arrays may be directed to the first and second most powerful reflected rays. In these embodiments, the MRC circuitry 126 may attempt to maximize the signal to interference and noise ratio (SINR) in one spatial stream received through both sub-arrays 104A and 104B, although other signal quality measures, such as signal-to-noise ratio (SNR) and bit-error-rate (BER), may be used.

In some embodiments, the channel-estimation block 118 may estimate channel characteristics associated with each sub-array 104. The channel-estimation block 118 may calculate weighting coefficients for ICI suppression for use using a MRC processing algorithm to maximize throughput through the channel. In some embodiments, to maximize the throughput, the weighting coefficients may be calculated to maximize the SINR of the channel through each signal path. In an example embodiment, the channel may be a multipath channel in which the data stream is received through two or more signal paths. In the example illustrated in FIG. 1, first ray 121 may be associated with a first signal path and second ray 123 may be associated with a second signal path. In these embodiments, at least two antenna beams are used for reception. In some embodiments, training signals may be transmitted by the transmitting station for use by the millimeter-wave transceiver 100 to estimate channel characteristics.

In some embodiments, the millimeter-wave transceiver 100 may be configured to receive multicarrier signals that comprise a plurality of subcarriers which may be arranged in subcarrier bands. The channel-estimation block 118 may estimate channel characteristics associated with each sub-array 104 for each subcarrier or subcarrier band across the channel. In these embodiments, the channel-estimation block 118 may calculate a set of the weighting coefficients for ICI suppression for each subcarrier or subcarrier band. The MRC circuitry 126 may apply a set of the weighting coefficients to baseband signals from each sub-array associated with each subcarrier or subcarrier band. In some embodiments, the multicarrier signals may comprise orthogonal frequency division multiplexed (OFDM) signals. In some embodiments, the multicarrier signals may be communicated in accordance with a multiple access technique, such as orthogonal frequency division multiple access (OFDMA), although this is not a requirement as a time-division multiple access (TDMA) or a frequency division multiple access (FDMA) technique may alternatively be used. In other embodiments, including IEEE 802.11 ad embodiments, carrier-sense multiple access techniques may be used.

In some embodiments, the RF circuitry 106 may include a phase shifter 108 associated with each antenna element of the antenna array 102. Each sub-array may comprise a plurality of the antenna elements and each phase shifter 108 may configured to phase-shift multicarrier signals received through an associated antenna element. The RF circuitry 106 may also include a signal summator 110 associated with each sub-array 104 to combine signals received through the associated sub-array 104. The coarse beam-steering block 116 may be configured to control the phase shifters 108 for generation of antenna beams 122 and 124.

The millimeter-wave transceiver 100 may also include a frequency-conversion block 112 associated with each sub-array to convert the combined signals from the signal summator 110 to baseband signals. The millimeter-wave transceiver 100 may also include a signal-processing block 114 which may include the channel-estimation block 118, the MRC circuitry 126 and the coarse beam-steering block 116.

The coarse beam-steering block 116 may control the phase shift of each of the phase shifters 108 for coarse beam steering. The coarse beam-steering block 116 may configure the phase shifters 108 to direct at least one sub-array 104A for receipt of signals from the first direction and direct at least another sub-array 104B for receipt of signals from the second direction.

The channel-estimation block 118 may estimate the channel characteristics for each sub-array based on the baseband signals from each sub-array and may generate weighting coefficients for application to the baseband signals for each sub-array for inter-carrier interference (ICI) suppression. The weighting coefficients may be calculated for ICI suppression in particular beam-steering direction. In some of these embodiments, training signals transmitted by the transmitting station may be used to estimate the channel characteristics.

In some embodiments, the MRC circuitry 126 may comprise a weighting block 120 to apply the set of weighting coefficients generated for each sub-array to the baseband signals for the associated sub-array. The MRC circuitry 126 may also include a summing block 127 to combine the weighted signals from the weighting block to generate the single data stream. In these embodiments, the output baseband signals 125 of the MRC circuitry 126 may be the weighted sum of the input signals.

In some embodiments, to identify the first and second directions, the coarse beam-steering block 116 may perform a beam selection procedure, such as the beam selection procedure of the WiGig 1.0 specification. In these embodiments, transmit (TX) and/or receive (RX) sector scans may be performed to select a best steering direction at the transmitter and at the receiver among pre-defined sets of directions (e.g., in different sectors). During these sector scans, the directions from which the most powerful signals that are received may be determined by the signal-processing block 114 and provided to the coarse beam-steering block 116 to allow the coarse beam-steering block 116 to generate phase control signals for the phase shifters 108.

In some embodiments, once the most powerful ray is identified by scanning, further scanning may be performed to identify additional rays (e.g., including the second most powerful ray) by excluding the previously identified ray. In these embodiments, once the antenna beams are directed to the identified rays, the weighting coefficients for ICI may be determined based on the established multi-path channel. In the case of a 2×2 multiple-input multiple-output (MIMO)

channel, the multipath channel may be described by 2×2 matrix H (at each subcarrier or subcarrier band) from which weighting coefficients for ICI may be determined using well-known MIMO algorithms.

Although embodiments described herein are described with respect to multicarrier signals, such as OFDM signals, the scope of the embodiments is not limited in this respect as they are equally applicable to single carrier signals.

In some embodiments, coarse beamforming is performed in the real channel between the sub-arrays 104 of the receiver and sub-arrays of a transmitter, while fine beamforming is performed on the effective channel represented by matrix H mentioned above for ICI suppression. In these embodiments, ICI suppression weights may be calculated based on MIMO processing techniques. For example, for minimum mean-square error (MMSE) estimation, the weights may be calculated for each subcarrier (or subcarrier band) using the following equation:

$$w = [H^H R^{-1} H + I]^{-1} H^H R^{-1}$$

In this equation, H may represent the channel matrix while the exponent H may represent the Hermitian operator (conjugate transpose) and R may represent an interference correlation matrix. Conventional approaches to beamforming by co-phasing the antenna array elements at the RF frequency do not provide an optimal solution (for example, for full ICI suppression) because the adjustments are made across the entire frequency band (by rough phase adjustments without signal amplitude weighting). Performing fine beamforming at baseband using a spatial processing algorithm, as described above, on the other hand, provides for a more optimal solution for interference suppression as it can take into account each subcarrier of a multicarrier signal.

Although millimeter-wave transceiver 100 is described herein with respect to the operations of the receiver side, the millimeter-wave transceiver 100 may include a transmitter side which may configure signals at baseband for transmission through two or more sub-arrays. In these embodiments, sub-arrays 104A and 104B may be configured for both transmission and reception, although this is not a requirement as separate sub-arrays may be used. In these embodiments, the transmitter side may perform fine beamforming at baseband and coarse beamforming at the RF frequency for transmission of signals.

Figure 2:
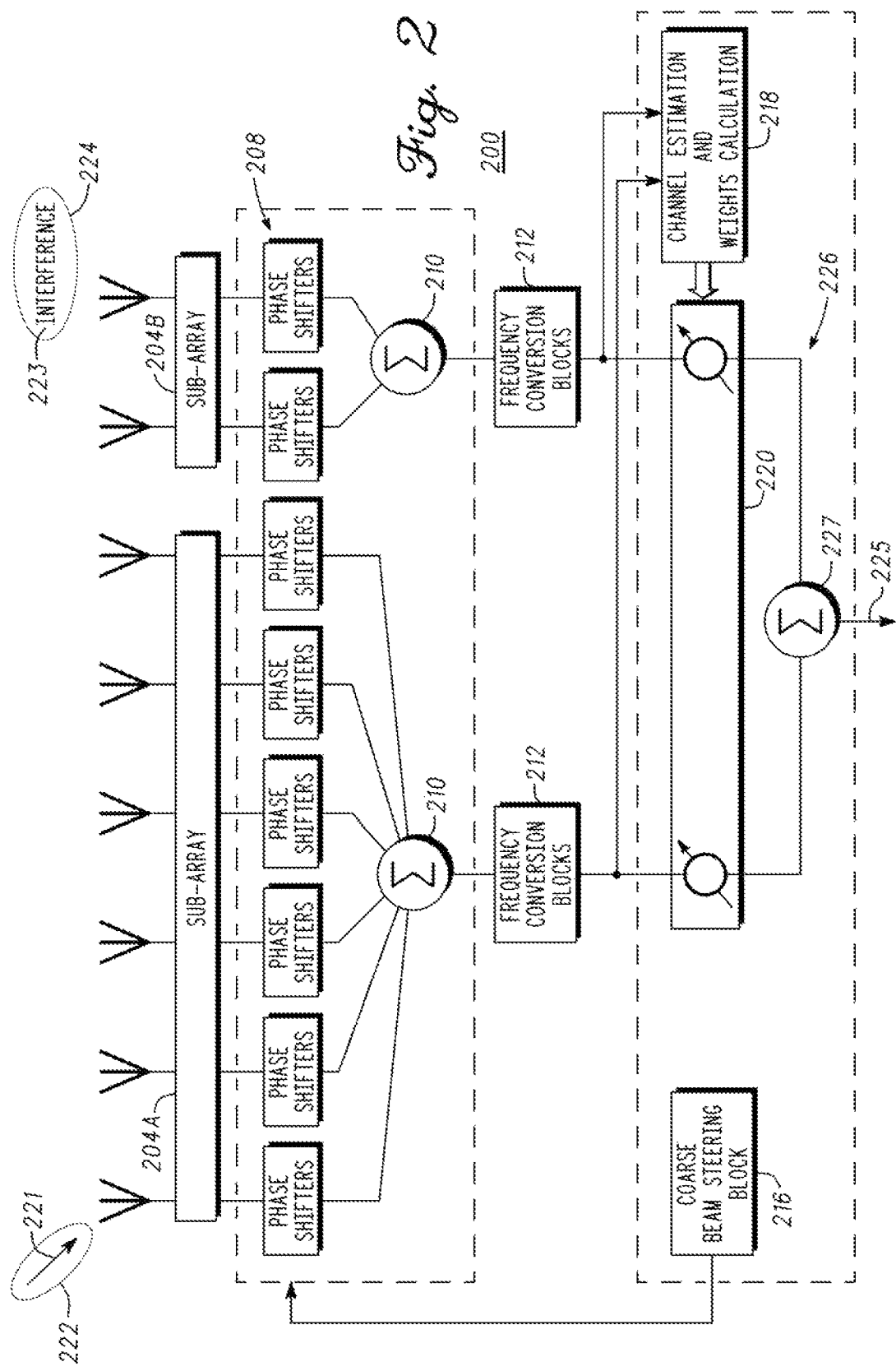
FIG. 2 illustrates a millimeter-wave transceiver with external interference cancellation in accordance with some embodiments.

FIG. 2 illustrates a millimeter-wave transceiver with external interference cancellation in accordance with some embodiments. Millimeter-wave transceiver 200 may also be configured for receiving multicarrier signals and may comprise a coarse beam-steering block 216 to control an antenna array comprising at least two independently controllable sub-arrays (204A and 204B). The coarse beam-steering block 216 may be configured to direct a first highly-directional antenna beam 222 with a first independent sub-array 204A in a first direction associated with a data signal 221 to establish a channel with a transmitting station. The coarse beam-steering block 216 may also be configured to generate a second less-directional antenna beam 224 with a second independent sub-array 204B for estimation of interference 223.

The millimeter-wave transceiver 200 may also include a channel-estimation block 218 to estimate channel characteristics of the established channel based on signals from the first independent sub-array 204A and to estimate interference based on signals from the second independent sub-array 204B. The channel-estimation block 218 may generate a set of weighting coefficients for each sub-array based on the channel characteristics and the interference estimate for interference cancellation to suppress interference from the data signal received through the first independent sub-array 204A.

The millimeter-wave transceiver 200 may also include interference cancellation circuitry 226 to apply the set of the weighting coefficients to baseband signals from each sub-array 204 and to combine the weighted baseband signals from each sub-array 204 to generate baseband signals 225 that represent a data stream (with interference cancelled from the data signal 221. In some embodiments, the channel-estimation block 218 may estimate channel characteristics of the established channel based on baseband signals only from the first independent sub-array 204A and may estimate interference based on baseband signals only from the second independent sub-array 204B. In these embodiments, interference estimates from the second independent sub-array 204B may be used to suppress interference from the data signal received through the first independent sub-array 204A.

In some embodiments, the first highly-directional antenna beam 222 may be directed in a direction associated with a highest received signal level. The second less directional antenna beam 224 may be generated to be more omnidirectional or substantially omnidirectional. The configuration of second less directional antenna beam 224 is not associated with a received signal level from a transmitting station. In some embodiments, the first independent sub-array 204A may include a greater number of antenna elements than the second independent sub-array 204B. In some embodiments, the first independent sub-array 204A may include a substantially greater number of antenna elements than the second independent sub-array 204B. In these embodiments, the first independent sub-array 204A may be configured with phase shifters 208 to generate a narrow directive antenna pattern which may be oriented to the direction of the maximal power or signal level and may be used for data reception and transmission. The second independent sub-array 204B, on the other hand, may configured with phase shifters 208 to generate a more omnidirectional pattern and may use a lesser number of array elements. In these embodiments, the second independent sub-array 204B may be used for accessing interference and tracking environmental changes. The baseband signals generated from the first independent sub-array 204A may be used for data demodulation, while the baseband signals generated from the second independent sub-array 204B may be used for interference signal estimation and further interference cancellation in interference cancellation circuitry 226.

In some embodiments, training sequences may be used for channel estimation. In these embodiments, the training signals may be used not only for channel estimation of the main channel, but also for the interference signals estimation. In other embodiments, interference signals may be extracted from received signals by a decision-directed method with help of the demodulated useful signal.

In these embodiments, interference signals may be characterized by an interference correlation matrix R. After obtaining both main link channel matrix H and interference correlation matrix R, the ICI weights (w) may be calculated by the expression discussed above.

In some embodiments, the second independent sub-array 204B may utilize a minimum number of antenna elements (i.e., either one or two elements) since it is generating a more omnidirectional pattern, while the first independent sub-array 204A will utilize a much greater number of elements since it is generating a highly-directional pattern.

In some of these embodiments, the interference cancellation circuitry 226 may apply either a MMSE or a zero-forcing (ZF) spatial processing algorithm. The set of weighting coefficients for each sub-array 204 may be generated for either the MMSE or ZF spatial processing algorithm. In these embodiments, the optimal weights may be based on the selected spatial processing algorithm. In these embodiments, the interference cancellation circuitry 226 may perform fine beamforming at baseband. The coarse beam-steering block 216 may perform coarse beam steering at the millimeter-wave frequency by controlling phase shifters 208.

One advantage to the use of a more omni-directional sub-array 204B in the embodiments illustrated in FIG. 2 is that it allows accessing and measurement of interference from substantially all directions, while the useful signal may be tracked from a particular direction with the first independent sub-array 204A. Furthermore, since an omni-directional antenna pattern does not suppress the interference (as does a more directional antenna beam directed toward the useful signal), the use of a more omni-directional pattern may provide a more precise measurement of the interference allowing for improved interference cancellation. By performing this fine beamforming at baseband, deeper nulls may result in the interfering signal than would result if such processing were performed at the RF level.

As illustrated in FIG. 2, millimeter-wave transceiver 200 may also include a signal summator 210 associated with each sub-array 204A and 204B, frequency conversion blocks 212 to generate baseband signals for each first and second independent sub-array 204A and 204B. The interference cancellation circuitry 226 may comprise a weighting block 220 to apply the weighting coefficients generated for each sub-array to the baseband signals for the associated sub-array. The interference cancellation circuitry 226 may also comprise a summing block 227 to combine the weighted signals from the weighting block 220 to generate baseband signals that may represent a single data stream with reduced interference.

In some embodiments, the millimeter-wave transceiver 200 may be configured to estimate a channel with a highly-directional antenna pattern generated with a first sub-array, estimate interference with a less directional more omnidirectional antenna pattern generated with a second sub-array, apply a first set of weighting coefficients to baseband signals of the first sub-array, the first set of weighting coefficients based on the channel estimate, apply a second set of weighting coefficients to baseband signals of the second sub-array, the second set of weighting coefficients based on the interference estimate, and combine the weighted baseband signals of both sub-arrays to generate an output signal with reduced interference that includes a signal of interested received through the first sub-array.

Figure 3:
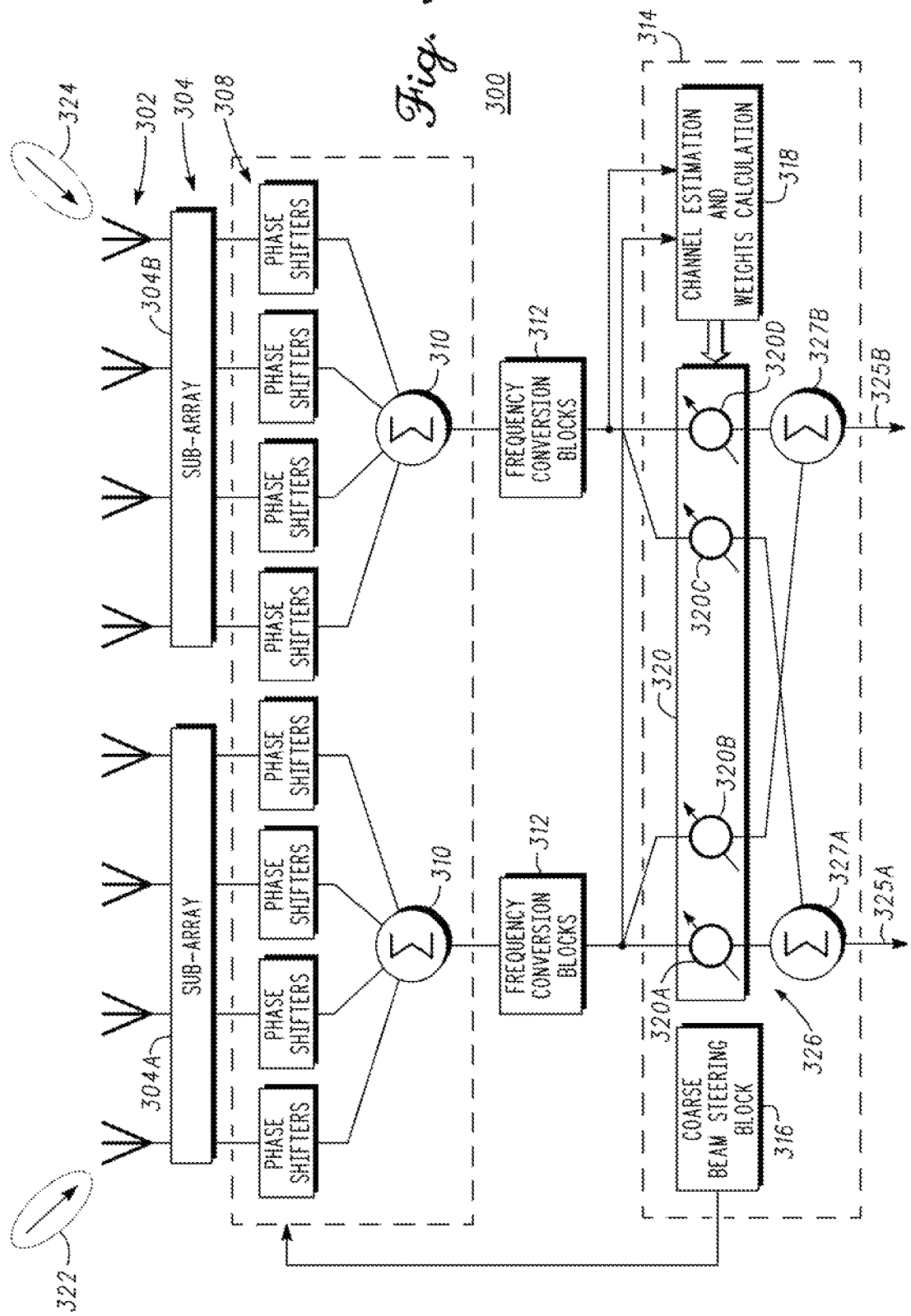
FIG. 3 illustrates a millimeter-wave transceiver for mutual intercarrier interference (ICI) cancellation in accordance with some embodiments.

FIG. 3 illustrates a millimeter-wave transceiver for mutual inter-channel interference (ICI) cancellation in accordance with some embodiments. Millimeter-wave transceiver 300 may be configured for MIMO reception of multicarrier signals and may perform mutual ICI cancellation. In these embodiments, the millimeter-wave transceiver 300 may comprise RF circuitry to receive multicarrier signals through an antenna array 302 comprising at least two independently controllable sub-arrays 304 from first and second directions. In these embodiments, a first sub-array 304A may be configured to receive signals from a first direction 322 and the second sub-array 304B may be configured to receive signals from a second direction 324.

The millimeter-wave transceiver 300 may also include a channel-estimation block 318 to generate sets of weighting coefficients for each sub-array 304A, 304B based on spatial channel characteristics of each MIMO subchannel determined from an associated sub-array 304. The weighting coefficients generated for mutual interference mitigation between the MIMO subchannels. The millimeter-wave transceiver 300 may also include interference-cancellation circuitry 326 to apply each set of the weighting coefficients to baseband signals from each sub-array 304. The weighted baseband signals from each sub-array 304 may be combined to generate combined baseband signals 325A, 325B for each spatial channel. In these embodiments, two sets of weighting coefficients may be generated for each sub-array. One set may be for interference cancellation while the other set may be for maximization of the desired signal. For example, one set of weighting coefficients may be applied by weighting element 320A to the baseband signals from first sub-array 304A for maximizing the throughput of that spatial channel (from first direction 322) and another set of weighting coefficients may be applied by weighting element 320B to the baseband signals from first sub-array 304A for cancellation of interference from the other spatial channel (from second direction 324). Likewise, one set of weighting coefficients may be applied by weighting element 320C to the baseband signals from second sub-array 304B for maximizing the throughput of that spatial channel (from second direction 324) and another set of weighting coefficients may be applied by weighting element 320D to the baseband signals from second sub-array 304B for cancellation of interference from the other spatial channel (from first direction 322).

In these embodiments, summing element 327A may combine the weighted baseband signals from weighting elements 320A and 320C to generate baseband signals 325A associated with a first stream Summing element 327B may combine the weighted baseband signals from weighting elements 320B and 320D to generate baseband signals 325B associated with a second stream.

In some embodiments, the spatial channels may use the same subcarriers (i.e., non-orthogonal subcarriers) and may transmit different data streams. In some embodiments, the first direction 322 (associated with one antenna beam) may be associated with a first spatial channel and the second direction 324 (associated with another antenna beam) may be associated with a second spatial channel. In some of these embodiments, the first and second spatial channels may comprise, for example, 2×2 MIMO subchannels in which a transmitting station uses two antennas or antenna arrays to transmit over two spatial streams.

In some embodiments, the interference-cancellation circuitry 326 may apply either a MMSE or ZF spatial processing algorithm. The sets of weighting coefficients for each sub-array 304 may be generated for the selected spatial processing algorithm. In these embodiments, separate sets of weighting coefficients may be generated for application to the baseband signals of each sub-array for maximizing throughput for each spatial channel.

In these embodiments, the millimeter-wave transceiver 300 may be configured to mitigate mutual interference between the MIMO spatial subchannels at the receiver side (as discussed above) both in single-user MIMO (SU-MIMO) as well as multi-user MIMO (MU-MIMO) modes. At the transmitter side, fine beamforming at baseband may be performed to create spatially-orthogonal signals for the different antenna arrays (for SU-MIMO and MU-MIMO). In some embodiments, the millimeter-wave transceiver 300 may be is operable in MU-MIMO mode in which data different users is received over each spatial channel.

As illustrated in FIG. 3, millimeter-wave transceiver 300 may also include phase shifters 308 controllable by coarse beam steering block 316, a summator 310 for each sub-array 304, frequency conversion blocks 312 to generate baseband signals for each sub-array 304A and 304B. The interference-cancellation circuitry 326 may comprise a weighting block 320 that includes the weighting elements 320A, 320B, 320C and 320D to apply the sets weighting coefficients generated for each sub-array to the baseband signals for the associated sub-array. The interference-cancellation circuitry 326 may also comprise the summing elements 327A and 327B to combine the weighted signals from the weighting block 320 to generate baseband signals 325A, 325B associated with each spatial channel. The millimeter-wave transceiver 300 may also include a signal-processing block 314 which may include the channel-estimation block 318, the interference-cancellation circuitry 326 and the coarse beam-steering block 316.

Referring to FIGS. 1, 2, and 3, the millimeter-wave transceivers 100, 200 and 300 disclosed herein may be stations (STAs) configured operate in accordance with a WiGig standard, an IEEE 802.11 ad standard and/or an IEEE 802.15 standard for millimeter-wave communications. In some embodiments, millimeter-wave transceivers 100, 200 and 300 may be WiGig tri-band enabled devices and may operate in the 2.4, 5 and 60 GHz bands to deliver data transfer rates up to seven Gbit/s or more. Some embodiments may use antenna weight vector (AWV), which is vector of weights describing the excitation (amplitude and phase) for each element of an antenna array. Some embodiments may use average noise plus interference power indicator (ANIPI), which may be a medium access control (MAC) indication of the average noise plus interference power measured on a channel that meets the two simultaneous conditions: 1) the station (STA) is not transmitting a frame, and 2) the station is not receiving a frame addressed to itself.

Some embodiments may use a directional band (DBand), which may be frequency band containing a channel with the channel starting frequency above 45 GHz. Some embodiments may implement a fast session transfer (FST), which may be a transfer of a session from a channel to another channel in the same or different frequency bands when the communicating STAs are both able to operate in the frequency band(s) they wish to communicate. In the context of FST, the term session refers to the state information kept in a pair of STAs that have established a direct link therebetween.

In some embodiments, the stations may operate as part of a personal basic service set (PBSS), which may be a basic service set (BSS) that operates in the directional band (DBand), includes one PBSS control point (PCP), and in which access to a distribution system (DS) is not present but an intra-PBSS forwarding service is optionally present. In some embodiments, a station may operate as a PBSS control point (PCP), which may be an entity that includes one station (STA) and coordinates access to the wireless medium by STAs that are members of a PBSS. In some embodiments, the stations may perform a sector sweep, which may include sequence of transmissions, separated by a short beamforming inter frame space (SBIFS) interval, in which the antenna configuration at the transmitter or receiver may be changed between transmissions.

In some embodiments, beamforming training (BFT) may be performed. BFT may begin with a sector level sweep (SLS) from the initiating station. A beam refinement protocol (BRP) may follow, if requested by either the initiating station or the responding station. The SLS phase may enable communications between the two participating STAs at the control PHY rate or at a higher modulation and coding scheme (MCS). The SLS phase may provide transmit beamforming training. The BRP phase may enable receiver training and enable iterative refinement of the AWV of both transmitter and receiver at both participating STAs. If one of the participating STAs chooses to use only one transmit antenna pattern, receive training may be performed as part of the SLS.

In some embodiments, for channel measurement, the auto-correlation properties of a Golay sequence may be used enable reconstructing part of the impulse response of the channel between the transmitter and the receiver. The receiver may find the tap with the largest amplitude in the channel during a field of the BRP-RX. It selects thereafter the set of taps that is measured around the tap with the largest amplitude. It may select a contiguous set of taps or select a non-contiguous set of taps, and include the tap delays subfield as part of the subfield measurement. It then measures the phase and amplitude of the corresponding channel taps in each of the TRN-T field repetition (except for those using the CE AWV configuration). The beam refinement feedback subfield k−1 is the relative amplitude and phase of this tap in the k'th repetition compared to this tap in the first TRN-T subfield.

In some embodiments, millimeter-wave transceivers 100, 200 or 300 may be a multiband communication device that may include physical-layer (PHY) circuitry for communicating in various frequency bands. In these embodiments, baseband circuitry and a single lower MAC may be provided for 2.4 GHz and 5 GHz frequency bands and may be configured for communication in accordance with one of the IEEE 802.11a/b/g/n/ac communication standards, although this is not a requirement. Baseband circuitry and another lower MAC may be provided for the 60 GHz frequency band and may be configured for communication in accordance with the WiGig or the IEEE 802.1 lad communication standards.

In some embodiments, each of the antenna elements, such as antenna elements, may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna.

Although the millimeter-wave transceivers 100, 200 are 300 are illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), radio-frequency integrated circuits (RFICs) and combinations of various hardware and logic circuitry for performing at least the functions described herein. In some embodiments, the functional elements of the millimeter-wave transceivers 100, 200 are 300 may refer to one or more processes operating on one or more processing elements.

In some embodiments, the PBSS may be configured to operate in accordance with a Wireless Gigabit Alliance (WiGig or WGA) specification or an IEEE 802.11 specification such as the Task Group ad (IEEE 802.1 lad) draft specification for multi-gigabit speed wireless communications technology operating over an unlicensed 60 GHz frequency band. The PBSS may be configured to operate in accordance with the WiGig Media-Access Control (MAC) or Physical Layer (PHY) specifications, version 1.0 or later, although this is not a requirement. In some other embodiments, the PBSS may be configured to operate in accordance with an IEEE 802.15.3 specification for high-rate WPANs, including the IEEE 802.15.3 Task Group 3c (TG3c).

In some embodiments, the central coordinator and the mmW stations comprise an infrastructure BSS (IBSS). The central coordinator may be an access point (AP) operating as a central coordinator for the IBSS. The IBSS may be configured to operate in accordance with the WiGig specification or the IEEE 802.11 ad specification referenced above.

The mmW stations (of which millimeter-wave transceivers 100, 200 or 300 may be part of) may include wireless display devices, laptop and portable computers, mobile communication devices (e.g., cell phones, smart phones or personal digital assistant (PDAs)), hard drives and other storage devices, digital audio players (e.g., MP3 players), web tablets, wireless headsets, pagers and instant messaging devices, digital cameras, televisions, medical devices (e.g., a heart rate monitor, a blood pressure monitor, etc.), or other device that may receive and/or transmit information using millimeter waves.

In some embodiments, the station-capability information provided in a station-capability information element that may be requested and/or provided in an information-request action frame, or provided in the information-response action frame to allow a mmW station to know the capabilities of other mmW stations. The station-capability information may include one or more of beamforming capabilities, the number of antennas and antenna capabilities, the number of elements per antenna, supported modulations and modulation capabilities, supported channels, and multi-user (MU) multiple-input multiple-output (MIMO) capabilities, among other things. This exchange of information may allow any non-central coordinator station to subsequently perform beamforming training for subsequent communication therebetween.

In some embodiments, the network coordinator (such as a PCP) to coordinate communications among the mmW communication stations and control access to the wireless medium. The network coordinator may broadcast a beacon frame that indicates the length of a beacon interval during which communications are to take place. The beacon frame may be received by the other stations thereby informing the other stations to when the next beacon interval will occur. In some embodiments, the next beacon interval may be identified by a beacon transmission. In accordance with some embodiments, a communication station may act as an initiating station to initiate BFT with other communication stations which may be referred to as responding stations. In these embodiments, the initiating station may perform multiple-access beamforming with one or more responding stations, such as responding stations. The initiating station may announce a number of sector-sweep (SS) slots of a BFT period and a number of SS frames within each SS slot. The initiating station may receive one or more SS frames from two or more of the responding stations within one of the SS slots of the BFT period and may transmit one or more SS feedback frames to the responding stations within the one SS slot to indicate an antenna configuration to the responding stations for communication with the initiating station. The indicated antenna configuration may refer to a particular antenna sector.

Figure 4:
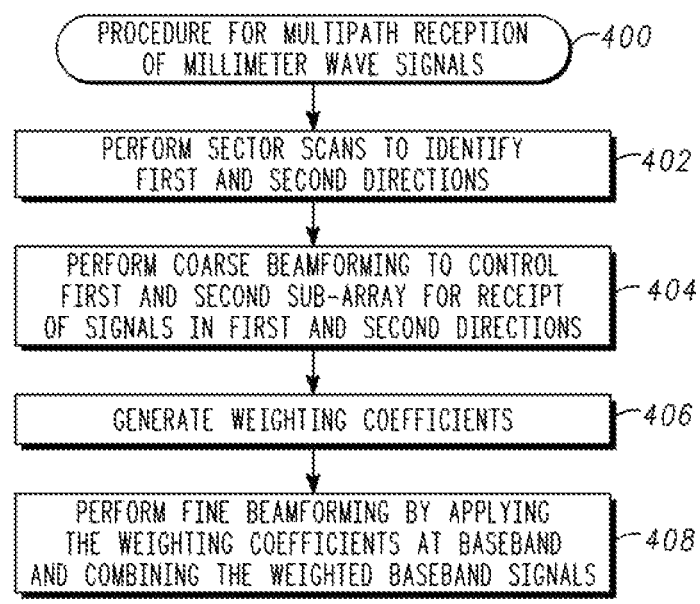
FIG. 4 is a procedure for multipath reception of millimeter-wave signals in accordance with some embodiments.

FIG. 4 is a procedure for multipath reception of millimeter-wave signals in accordance with some embodiments. Procedure 400 may be performed by a millimeter wave transceiver, such as millimeter-wave transceiver 100 (FIG. 1), although other transceiver configurations may also be suitable.

In operation 402, sector scans may be performed to identify the first and second directions. In some embodiments, the first direction may be associated with received signals of a highest signal level and the second direction may be associated with received signals of a next highest signal level.

In operation 404, coarse beamforming may be performed to control the first and second sub-arrays for receipt of signals in the first and second directions. In some embodiments, the coarse beam-steering block 116 (FIG. 1) may configure phase shifters 108 (FIG. 1).

In operation 406, weighting coefficients may be generated. In some embodiments, a set of weighting coefficients for each sub-array based on channel characteristics determined from each sub-array 104 may be generated. In some embodiments, the weighting coefficients generated for ICI suppression.

In operation 408, fine beamforming may be performed by applying the weighting coefficients at baseband and combining the weighted baseband signals. In some embodiments, MRC circuitry 126 (FIG. 1) may apply a set of the weighting coefficients to baseband signals from each sub-array and may combine the weighted baseband signals from each sub-array to generate combined baseband signals that represent a single data stream.

In some embodiments, a method for reducing interference in millimeter-wave signals is provided. In these embodiments, the method comprises estimating a channel with a highly-directional antenna pattern generated with a first sub-array; estimating interference with a less directional more omnidirectional antenna pattern generated with a second sub-array; applying a first set of weighting coefficients to baseband signals of the first sub-array, the first set of weighting coefficients based on the channel estimate; applying a second set of weighting coefficients to baseband signals of the second sub-array, the second set of weighting coefficients based on the interference estimate; and combining the weighted baseband signals of both sub-arrays to generate an output signal with reduced interference that includes a signal of interest received through the first sub-array.

In some embodiments, the method further comprises configuring the first sub-array to provide the highly-directional antenna pattern in a direction associated with the signal of interest by phasing signals received through each of a plurality of antenna elements of the first sub-array; and configuring the second sub-array to provide the less directional more omnidirectional antenna pattern by phasing signals received through each of a plurality of antenna elements of the second sub-array.

In some embodiments, the weighting coefficients of the first and second sets are generated for a selected processing algorithm comprising minimum mean-square error (MMSE) or zero forcing (ZF) that is implemented through the application of the weighting coefficients to baseband signals and the combining of the baseband signals. In some embodiments, the first sub-array includes more antenna elements than the second sub-array.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A millimeter-wave transceiver configured for multipath reception of multicarrier signals comprising:
RF circuitry to receive the multicarrier signals through at least two independently controllable sub-array antennas from first and second directions, the first direction being associated with received signals of a highest signal level and the second direction being associated with received signals of a next highest signal level;
a channel-estimation block to generate a set of weighting coefficients for each sub-array antenna based on channel characteristics determined from each sub-array antenna, the weighting coefficients generated for inter-channel interference (ICI) suppression; and maximum-ratio combining (MRC) circuitry to apply the set of the weighting coefficients to baseband signals from each sub-array antenna and to combine the weighted baseband signals from each sub-array antenna to generate combined baseband signals that represent a single data stream.

2. The millimeter-wave transceiver of claim 1, further comprising a coarse beam-steering block to control an antenna array comprising the at least two independent sub-array antennas, the coarse beam-steering block to direct a first antenna beam for receipt of the multicarrier signals in the first direction and to direct a second antenna beam for receipt of the multicarrier signals in the second direction, both the first antenna beam and the second antenna beam establishing a channel with a transmitting station.

3. The millimeter-wave transceiver of claim 2, wherein the coarse beam-steering block is to perform a beam selection procedure that includes performing sector scans to identify the first and second directions based on signal levels of the received signals, and wherein the coarse beam-steering block is to direct the first antenna beam in the first direction using a first of the independent sub-array antennas and is to direct the second antenna beam in the second direction using a second of the independent sub-array antennas.

4. The millimeter-wave transceiver of claim 3, wherein the beam selection procedure includes performing a sector scan to identify a most powerful ray associated with the first direction, and performing a second sector scan excluding the previously identified most powerful ray to identify a second most power ray associated with the second direction.

5. The millimeter-wave transceiver of claim 1,
wherein the channel-estimation block is to estimate the channel characteristics associated with each sub-array antenna, and
wherein the channel-estimation block calculates the weighting coefficients for ICI suppression for use using a MRC processing algorithm to maximize throughput through a channel.

6. The millimeter-wave transceiver of claim 5, wherein the multicarrier signals comprise a plurality of subcarriers or subcarrier bands, and
wherein the channel-estimation block is to estimate channel characteristics associated with each sub-array antenna for each subcarrier or subcarrier band across the channel, and
wherein the channel-estimation block calculates a set of the weighting coefficients for ICI suppression for each subcarrier or subcarrier band, and
wherein the MRC circuitry is to apply a set of the weighting coefficients to baseband signals associated with each subcarrier or subcarrier band.

7. The millimeter-wave transceiver of claim 2, wherein the RF circuitry further comprises:
a phase shifter associated with each antenna element of the antenna array, wherein each sub-array antenna comprising a plurality of the antenna elements and each phase shifter configured to phase-shift multicarrier signals received through an associated antenna element; and
a signal summator associated with each sub-array antenna to combine signals received through the associated sub-array antenna.

8. The millimeter-wave transceiver of claim 7, wherein the millimeter-wave transceiver further comprises a frequency-conversion block associated with each sub-array antenna to convert the combined signals from the signal summator to baseband signals; and
a signal-processing block comprising:
the MRC circuitry;
the coarse beam-steering block to control the phase shift of each of the phase shifters, wherein the coarse beam-steering block is to direct at least one sub-array antenna for receipt of signals from the first direction and direct at least another sub-array antenna for receipt of signals from the second direction; and
the channel-estimation block to estimate the channel for each sub-array antenna based on the baseband signals and to generate weighting coefficients for application to the baseband signals for each sub-array antenna for inter-carrier interference (ICI) suppression, the weighting coefficients calculated for ICI suppression for a particular beam-steering direction.

9. The millimeter-wave transceiver of claim 8, wherein the MRC circuitry comprises:
a weighting block to apply the set of weighting coefficients generated for each sub-array antenna to the baseband signals for the associated sub-array antenna; and
a summing block to combine the weighted signals from the weighting block to generate the single data stream.

10. A millimeter-wave transceiver comprising:
hardware processing circuitry configured to:
estimate a channel with a highly-directional antenna pattern generated with a first sub-array antenna;
cause the first sub-array antenna to provide the highly-directional antenna pattern in a direction associated with a signal of interest by phasing signals received through each of a plurality of antenna elements of the first sub-array antenna;
estimate interference with a less directional more omnidirectional antenna pattern generated with a second sub-array antenna;
cause the second sub-array antenna to provide the less directional more omnidirectional antenna pattern by phasing signals received through each of a plurality of antenna elements of the second sub-array antenna;
apply a first set of weighting coefficients to first baseband signals of the first sub-array antenna, the first set of weighting coefficients based on the channel estimate;
apply a second set of weighting coefficients to second baseband signals of the second sub-array antenna, the second set of weighting coefficients based on the interference estimate; and
combine the weighted first and second baseband signals to generate an output signal with reduced interference that includes the signal of interest received through the first sub-array antenna.

11. The millimeter-wave transceiver of claim 10, wherein the hardware processing circuitry is further configured to:
generate weighting coefficients of the first and second sets for a selected processing algorithm comprising minimum mean-square error (MMSE) or zero forcing (ZF) that applies the weighting coefficients to the first and second baseband signals and the combining of combines the first and second baseband signals;
wherein the first sub-array antenna includes more antenna elements than the second sub-array antenna.

12. A millimeter-wave transceiver configured for MIMO reception of multicarrier signals comprising:
RF circuitry to receive multicarrier signals through two independently controllable sub-array antennas from first and second directions, the first direction being associated with received signals of a highest signal level and the second direction being associated with received signals of a next highest signal level;

a channel-estimation block to generate sets of weighting coefficients for each sub-array antenna based on spatial channel characteristics of each MIMO subchannel determined from an associated sub-array antenna, the weighting coefficients generated for mutual interference mitigation between the MIMO subchannels; and interference-cancellation circuitry to apply each set of the weighting coefficients to baseband signals from each sub-array antenna and to combine the weighted baseband signals to generate combined basebands for each spatial channel.

13. The millimeter-wave transceiver of claim 12, wherein the first direction is associated with a first spatial channel and the second direction associated with a second spatial channel, the first and second spatial channels comprising the MIMO subchannels.

14. The millimeter-wave transceiver of claim 13, wherein the millimeter-wave transceiver is operable in a multi-user MIMO (MU-MIMO) mode in which data from different users is received over each spatial channel.

15. A millimeter-wave transceiver configured for MIMO reception of multicarrier signals comprising:

RF circuitry to receive multicarrier signals through two independently controllable sub-array antennas from first and second directions;

a channel-estimation block to generate sets of weighting coefficients for each sub-array antenna based on spatial channel characteristics of each MIMO subchannel determined from an associated sub-array antenna, the weighting coefficients generated for mutual interference mitigation between the MIMO subchannels; and interference-cancellation circuitry to apply each set of the weighting coefficients to baseband signals from each sub-array antenna and to combine the weighted baseband signals to generate combined basebands for each spatial channel;

wherein the first direction is associated with a first spatial channel and the second direction associated with a second spatial channel, the first and second spatial channels comprising the MIMO subchannels;

wherein the interference cancellation circuitry is to apply either a minimum mean-square error (MMSE) or a zero-forcing (ZF) spatial processing algorithm, and wherein the sets of weighting coefficients for each sub-array antenna are generated for the MMSE or the ZF spatial processing algorithm.

16. A method for receiving millimeter-wave signals comprising:

performing coarse beamforming to receive RF signals from first and second directions with independently controllable antenna sub-array antennas; and performing fine beamforming at baseband by applying sets of weighting coefficients for interference cancellation to baseband signals from each of the independently controllable antenna sub-array antennas;

wherein performing coarse beamforming includes:

performing a beam selection procedure that includes performing sector scans to identify the first and second directions based on signal levels of received signals;

directing a first antenna beam in the first direction using a first of the independent controllable antenna sub-array antennas; and directing a second antenna beam in the second direction using a second of the independent controllable antenna sub-array antennas; and wherein the beam selection procedure includes:

performing a sector scan to identify a most powerful ray associated with the first direction; and performing a second sector scan excluding a previously identified most powerful ray to identify a second most power ray associated with the second direction, and, wherein performing fine beamforming includes:

generating a set of weighting coefficients for each sub-array antenna based on channel characteristics determined from each sub-array antenna, the weighting coefficients generated for inter-channel interference (ICI) suppression; and applying a set of the weighting coefficients to baseband signals from each sub-array antenna and combining the weighted baseband signals from each sub-array antenna to generate combined baseband signals that represent a single data stream.

* * * * *

UNITED STATES PATENT AND TRADEMARK OFFICE
CERTIFICATE OF CORRECTION

PATENT NO.         : 9,160,430 B2                                          Page 1 of 1
APPLICATION NO.    : 13/993900
DATED              : October 13, 2015
INVENTOR(S)        : Maltsev et al.

It is certified that error appears in the above-identified patent and that said Letters Patent is hereby corrected as shown below:

On the title page

Item (75), "Inventors", column 1, line 1, delete "Novgorod" and insert --Nizhny Novgorod--, therefor Item (75), "Inventors", column 1, line 2, delete "Novgorod" and insert --Nizhny Novgorod--, therefor Signed and Sealed this
Twenty-first Day of June, 2016

Michelle K. Lee
*Director of the United States Patent and Trademark Office*